United States Patent
Mujtaba et al.

(10) Patent No.: US 8,964,522 B2
(45) Date of Patent: Feb. 24, 2015

(54) METHOD AND APPARATUS FOR COMMUNICATING ORTHOGONAL PILOT TONES IN A MULTIPLE ANTENNA COMMUNICATION SYSTEM

(75) Inventors: Syed Aon Mujtaba, Watchung, NJ (US); Xiaowen Wang, Bridgewater, NJ (US)

(73) Assignee: LSI Corporation, Milpitas, CA (US)

( * ) Notice: Subject to any disclaimer, the term of this patent is extended or adjusted under 35 U.S.C. 154(b) by 2168 days.

(21) Appl. No.: 11/572,450

(22) PCT Filed: Sep. 9, 2005

(86) PCT No.: PCT/US2005/032253
§ 371 (c)(1),
(2), (4) Date: Jan. 30, 2007

(87) PCT Pub. No.: WO2006/029362
PCT Pub. Date: Mar. 16, 2006

(65) Prior Publication Data
US 2008/0232239 A1 Sep. 25, 2008

Related U.S. Application Data

(60) Provisional application No. 60/608,472, filed on Sep. 9, 2004.

(51) Int. Cl.
*H04W 48/08* (2009.01)
*H04B 7/06* (2006.01)
(Continued)

(52) U.S. Cl.
CPC ............ *H04B 7/0669* (2013.01); *H04B 7/0684* (2013.01); *H04B 7/10* (2013.01);
(Continued)

(58) Field of Classification Search
CPC ...... H04B 7/0669; H04B 7/0684; H04B 7/10; H04L 5/023; H04L 27/2602; H04W 48/08; H04W 84/12

USPC ......... 370/203, 208, 209, 210, 310, 328, 329, 370/335; 375/259, 260, 267; 455/39, 63.1, 455/73, 550.1, 561, 562.1
See application file for complete search history.

(56) References Cited

U.S. PATENT DOCUMENTS 5,903,551 A * 5/1999 Kingston et al. ............. 370/335
6,141,542 A 10/2000 Kotzin et al.
(Continued)

FOREIGN PATENT DOCUMENTS

EP 1 249 980 10/2002
JP 2002-374224 12/2002
(Continued)

OTHER PUBLICATIONS

Sun et al., "Training Sequence Assisted Channel Estimation for MIMO OFDM ," IEEE Wireless Communications and Networking Conference, pp. 38-43 (Mar. 16, 2003).
(Continued)

*Primary Examiner* — Paul H Masur
(74) *Attorney, Agent, or Firm* — Daniel J. Santos; Smith Risley Tempel Santos LLC (57) ABSTRACT

Methods and apparatus are provided for communicating pseudo-orthogonal pilot tones in a multiple antenna communication system. Data is transmitted in a multiple antenna communication system having N transmit antennas by generating a number of pilot tones for each of the N transmit antennas, wherein the pilot tones for each of the N transmit antennas are pseudo-orthogonal with each other; and transmitting the data on each of the N transmit antennas. The pilot tones are generally embedded in the data. Data is received in a multiple antenna communication system having N transmit antennas by receiving the data on each of the N transmit antennas, wherein the data includes a number of pilot tones for each of the N transmit antennas, wherein the pilot tones for each of the N transmit antennas are pseudo-orthogonal with each other. The pilot tones can be orthogonal in the frequency domain, time domain, spatial domain, or all of them.

20 Claims, 14 Drawing Sheets

(51) Int. Cl.
*H04B 7/10* (2006.01)
*H04L 5/02* (2006.01)
*H04L 27/26* (2006.01)
*H04W 48/16* (2009.01)
*H04W 84/12* (2009.01)

(52) U.S. Cl.
CPC ........... *H04L 5/023* (2013.01); *H04L 27/2602* (2013.01); *H04W 48/08* (2013.01); *H04W 48/16* (2013.01); *H04W 84/12* (2013.01)
USPC ..................................................... 370/208

(56) References Cited

U.S. PATENT DOCUMENTS

| | | | | |
|---|---|---|---|---|
| 6,473,467 | B1* | 10/2002 | Wallace et al. | 375/267 |
| 7,218,172 | B2* | 5/2007 | Blodgett | 330/149 |
| 7,324,429 | B2* | 1/2008 | Walton et al. | 370/203 |
| 7,372,913 | B2* | 5/2008 | van Zelst et al. | 375/267 |
| 2001/0031647 | A1* | 10/2001 | Scherzer et al. | 455/562 |
| 2002/0065047 | A1* | 5/2002 | Moose | 455/63 |
| 2002/0101825 | A1 | 8/2002 | Beck et al. | |
| 2004/0131007 | A1* | 7/2004 | Smee et al. | 370/208 |
| 2004/0136349 | A1* | 7/2004 | Walton et al. | 370/338 |
| 2005/0063378 | A1* | 3/2005 | Kadous | 370/389 |
| 2005/0220051 | A1* | 10/2005 | Lavean | 370/330 |
| 2006/0018394 | A1* | 1/2006 | van Zelst et al. | 375/260 |
| 2010/0074301 | A1* | 3/2010 | Howard et al. | 375/130 |

FOREIGN PATENT DOCUMENTS

| | | |
|---|---|---|
| JP | 2003-283441 | 10/2003 |
| JP | 2003-304215 | 10/2003 |
| WO | WO 03/065608 | 8/2003 |
| WO | WO 2004/030265 A1 | 4/2004 |
| WO | WO 2004/038988 A2 | 5/2004 |
| WO | WO 2004/064295 | 7/2004 |

OTHER PUBLICATIONS

Barhumi et al., "Optimal Training Design for MIMO OFDM Systems in Mobile Wireless Channels," IEEE Transactions on Signal Processing, vol. 51, No. 6, pp. 1616-1624, Jun. 2003.

* cited by examiner

METHOD AND APPARATUS FOR COMMUNICATING ORTHOGONAL PILOT TONES IN A MULTIPLE ANTENNA COMMUNICATION SYSTEM

CROSS-REFERENCE TO RELATED APPLICATIONS

The present application claims priority to U.S. Provisional Patent Application Ser. No. 60/608,472, filed Sep. 9, 2004, incorporated by reference herein.

FIELD OF THE INVENTION

The present invention relates generally to multiple antenna wireless communication systems, and more particularly, to phase and frequency offset estimation techniques for a multiple antenna communication system.

BACKGROUND OF THE INVENTION

Multiple transmit and receive antennas have been proposed to provide both increased robustness and capacity in next generation Wireless Local Area Network (WLAN) systems. The increased robustness can be achieved through techniques that exploit the spatial diversity and additional gain introduced in a system with multiple antennas. The increased capacity can be achieved in multipath fading environments with bandwidth efficient Multiple Input Multiple Output (MIMO) techniques. A multiple antenna communication system increases the data rate in a given channel bandwidth by transmitting separate data streams on multiple transmit antennas. Each receiver receives a combination of these data streams on multiple receive antennas.

In order to properly receive the different data streams, receivers in a multiple antenna communication system must acquire the channel matrix through training. This is generally achieved by using a specific training symbol, or preamble, to perform synchronization and channel estimation. The preamble helps the receiver (i) estimate the power of the received signal to set an automatic gain control (AGC) function; (ii) acquire the timing offset to perform optimal placement of a Fast Fourier Transform (FFT) window; (iii) estimate the frequency offset between the transmitter and receiver, and correct for the frequency offset prior to FFT demodulation; and (iv) estimate the channel transfer function to help demap the Quadrature Amplitude Modulation (QAM) symbols after the FFT has been performed.

In addition, a number of pilot tones are embedded in the OFDM data symbols to estimate the phase noise and residual frequency offset. Phase noise at the local oscillators of the transmitter and receiver creates a common phase error (CPE) at the FFT output that generally needs to be corrected for every OFDM symbol. Residual frequency offset at the input of the FFT also creates CPE. In general, the accuracy of the CPE estimation increases with the number of pilots, thereby reducing the packet error rate, and increasing the reliability of the transmission.

Generally, MIMO systems transmit the same pilot tones and polarization sequence on all the antennas. The pilots are a determined signal. Thus, there are certain beam patterns of the pilots. In a frequency selective channel, different pilot tones will experience different channels. Thus, each pilot tone has a different beam pattern. Therefore, some pilots will be enhanced by the channel while other pilots will be cancelled. It has been observed that the beam forming is more sever in the case of "flat fading" channels. In this case, all the pilots experience the same channel fading and can all be cancelled out. Thus, although the channel conditions allow the receiver to receive the data correctly, the receiver may not be able to process the data because the pilots are all faded.

Generally, MIMO systems transmit the same pilot tones and polarization sequence on all the antennas. The pilots are a deterministic signal. Thus, if the channel from multiple transmit antennas to a given receive antenna is highly correlated, the pilots will create certain beam pattern in the far field. Therefore, as a function of the azimuth angle in the two dimensional plane, some pilots will be enhanced by the channel while other pilots will be degraded. It has been observed that the beam forming is most severe in the case of "flat fading" channels whereby the channel does not change as a function of frequency. In this case, all the pilots experience the same channel fading and can cancel out as specific azimuth angles. Thus, although the channel conditions allow the receiver to receive the data correctly, the receiver may not be able to process the data because of catastrophic fading on the pilots.

A need therefore exists for methods and apparatus for communicating orthogonal pilot tones in a multiple antenna communication system, such that the pilot tones will not cancel one another in the channel.

SUMMARY OF THE INVENTION

Generally, methods and apparatus are provided for communicating pseudo-orthogonal pilot tones in a multiple antenna communication system. According to one aspect of the invention, data is transmitted in a multiple antenna communication system having N transmit antennas by generating a number of pilot tones for each of the N transmit antennas, wherein the pilot tones for each of the N transmit antennas are pseudo-orthogonal with each other; and transmitting the data on each of the N transmit antennas. The pilot tones are generally embedded in the data. The pilot tones can be orthogonal in the frequency domain, time domain, spatial domain, or all of them.

According to another aspect of the invention, data is received in a multiple antenna communication system having N transmit antennas by receiving the data on each of the N transmit antennas, wherein the data includes a number of pilot tones for each of the N transmit antennas, wherein the pilot tones for each of the N transmit antennas are pseudo-orthogonal with each other.

A more complete understanding of the present invention, as well as further features and advantages of the present invention, will be obtained by reference to the following detailed description and drawings.

BRIEF DESCRIPTION OF THE DRAWINGS

FIG. 10 illustrates a set of 4 frequency domain BPSK encoded orthogonal pilots in 20 MHz for an exemplary four antenna MIMO system;

DETAILED DESCRIPTION

The present invention recognizes that the pilot cancellation problem that is present, for example, in the case of "flat fading" channels, can be overcome by transmitting orthogonal pilots across the various antennas. According to one aspect of the invention, an orthogonal pilot design is provided in both the frequency and space domains. Thus, as discussed further below, orthogonal codes are used for the pilot signal across the frequency and spatial dimensions. The transmission of orthogonal pilot signals across frequency and space mitigates the beam forming effect. Thus, on average, there is no beam forming of the pilots.

Figure 1:
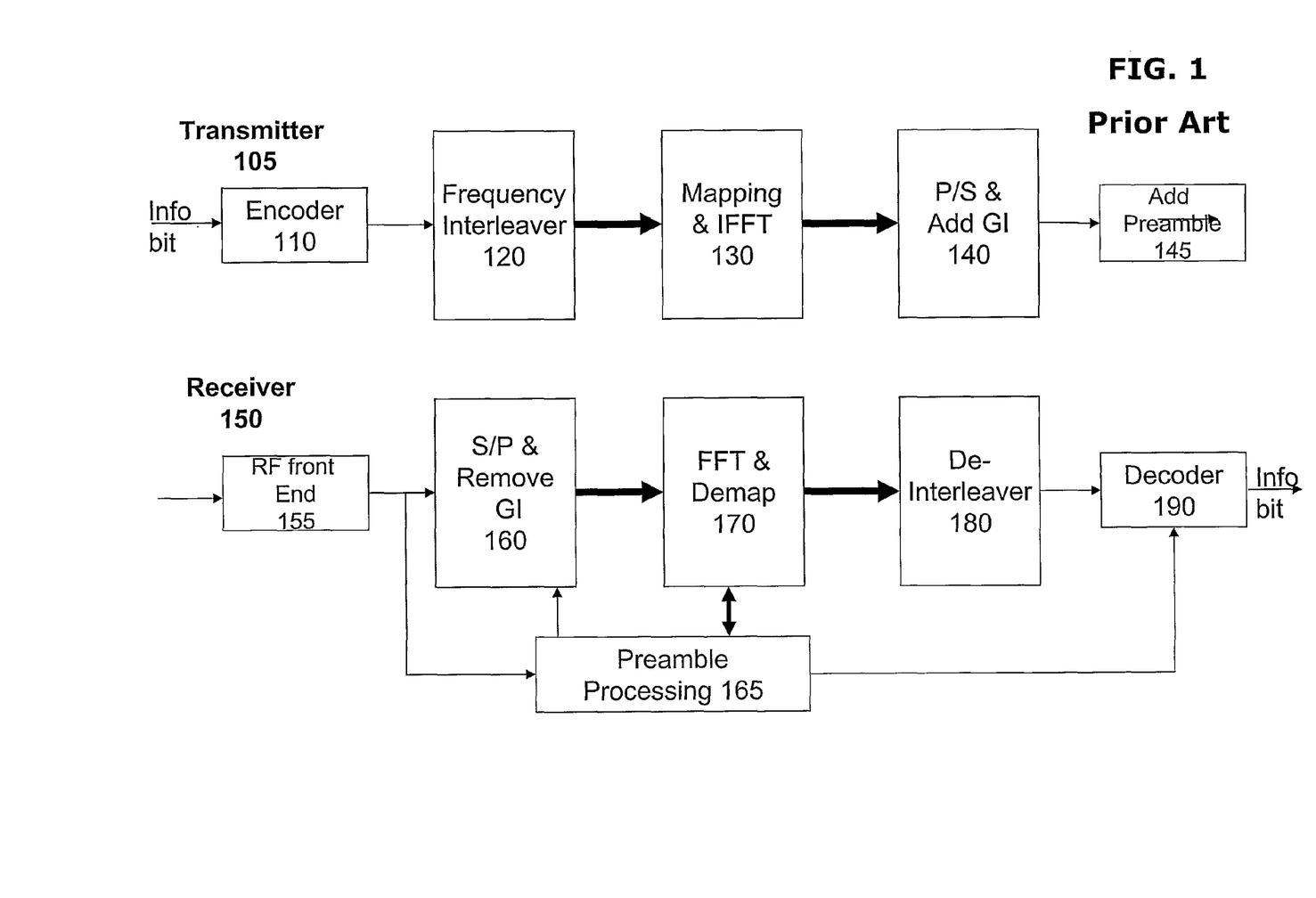
FIG. 1 is a schematic block diagram of a conventional 802.11a/g transceiver.

FIG. 1 is a schematic block diagram of a conventional 802.11a/g transceiver 100. At the transmitter side 105, the information bits are first encoded at stage 110 and then frequency interleaved at stage 120. The encoded and interleaved bits are then mapped onto subcarriers (tones) at stage 130 and form a frequency domain OFDM signal. The frequency domain OFDM signal is translated to the time domain by an inverse Fourier transform (IFFT) during stage 130. At stage 140, the data is serialized and a guard interval is added to each OFDM symbol. Finally, a preamble including training and signal fields is added during stage 145 at the beginning of each packet.

At the receiver side 150, the received signal is initially processed by the RF front end 155, and then the serial data is parallelized and the guard interval is removed at stage 160. The time domain signal is translated to the frequency domain using an FFT 170 and the subcarriers are demapped to encoded and interleaved bits. Meanwhile, the preamble is processed at stage 165. The interleaved bits are deinterleaved at stage 180 and decoded at stage 190 to provide the transmitted information bits.

Figure 2:
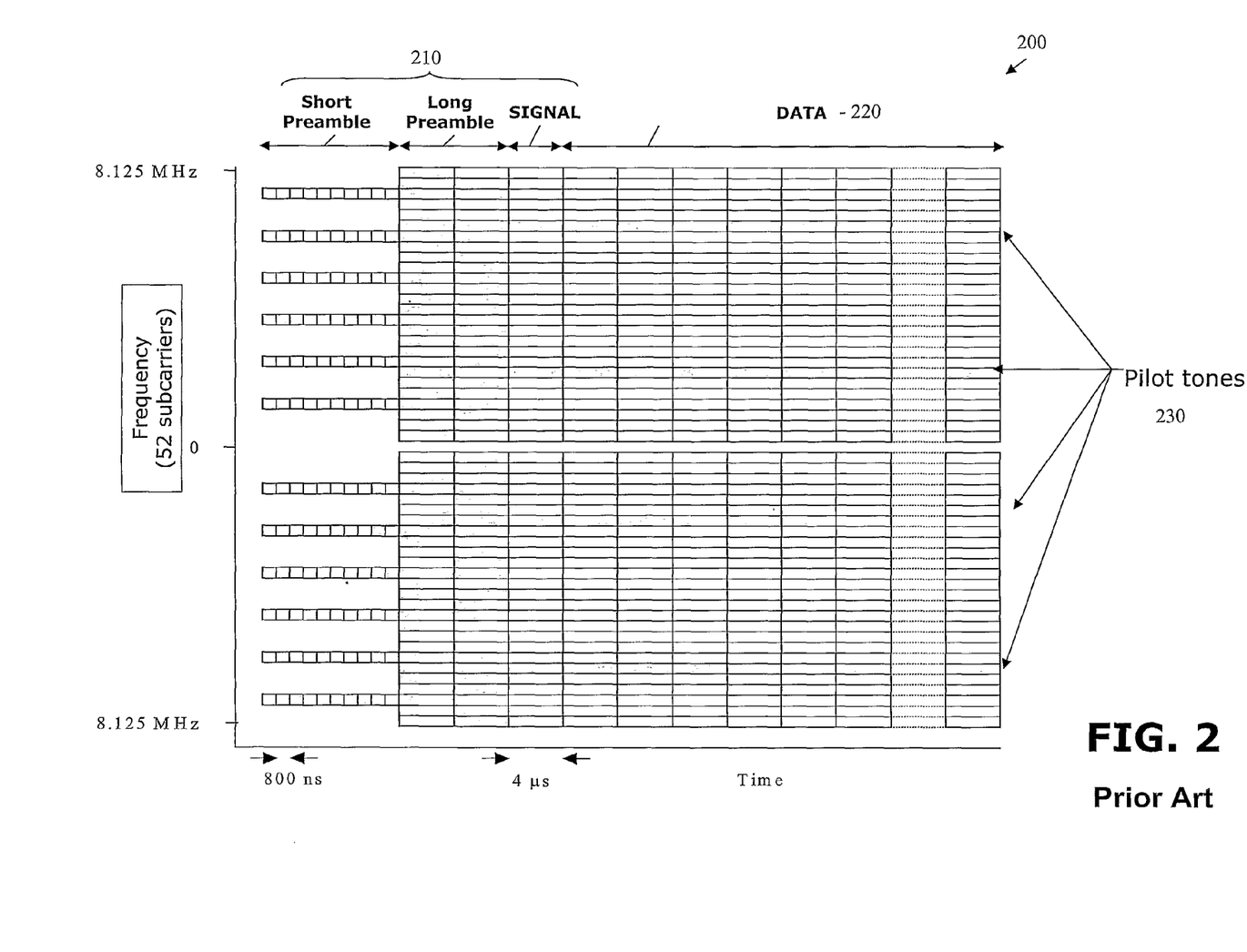
FIG. 2 illustrates an exemplary frame format for an exemplary IEEE 802.11a/g OFDM system.

FIG. 2 illustrates an exemplary frame format 200 for an exemplary IEEE 802.11a/g OFDM system. As shown in FIG. 2, each frame 200 (or packet) starts with a preamble 210 to establish correct synchronization at the receiver, in a known manner, followed by the user data 220. Each preamble 210 comprises a short preamble, a long preamble and a SIGNAL field. Each data symbol contains four pilot tones 230. As previously indicated, these pilot tones 230 are used to track the carrier frequency offset, timing drift and amplitude droop.

Figure 3:
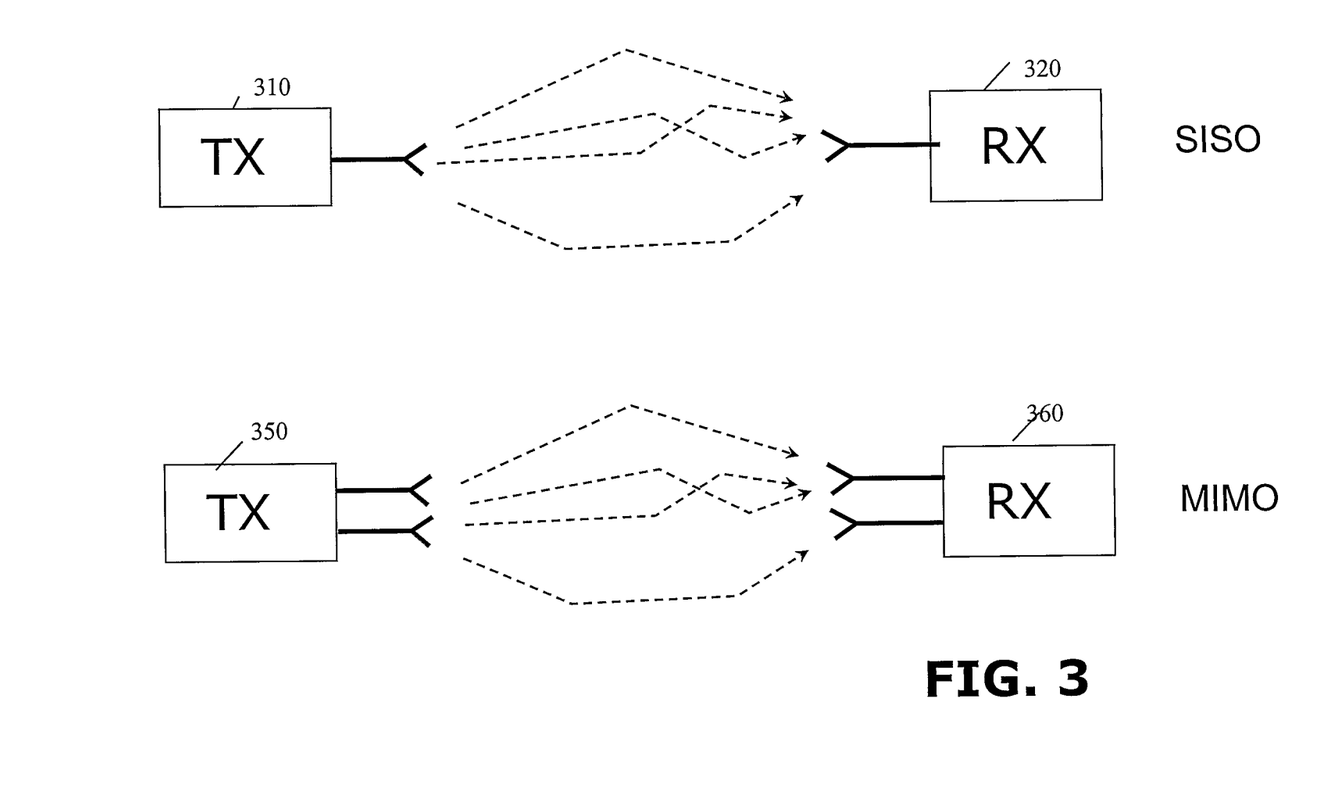
FIG. 3 illustrates the transmission of data in exemplary Single Input Single Output (SISO) and MIMO systems.

In a MIMO system, different transmitter antennas transmit different data OFDM symbols. FIG. 3 illustrates the transmission of data in exemplary Single Input Single Output (SISO) and MIMO systems. As shown in FIG. 3, a SISO transmitter 310 having a single antenna transmits data to a SISO receiver 320 having a single antenna. In addition, an exemplary MIMO transmitter 350 having two antennas transmits data to an exemplary MIMO receiver 360 having two antennas.

Figure 4:
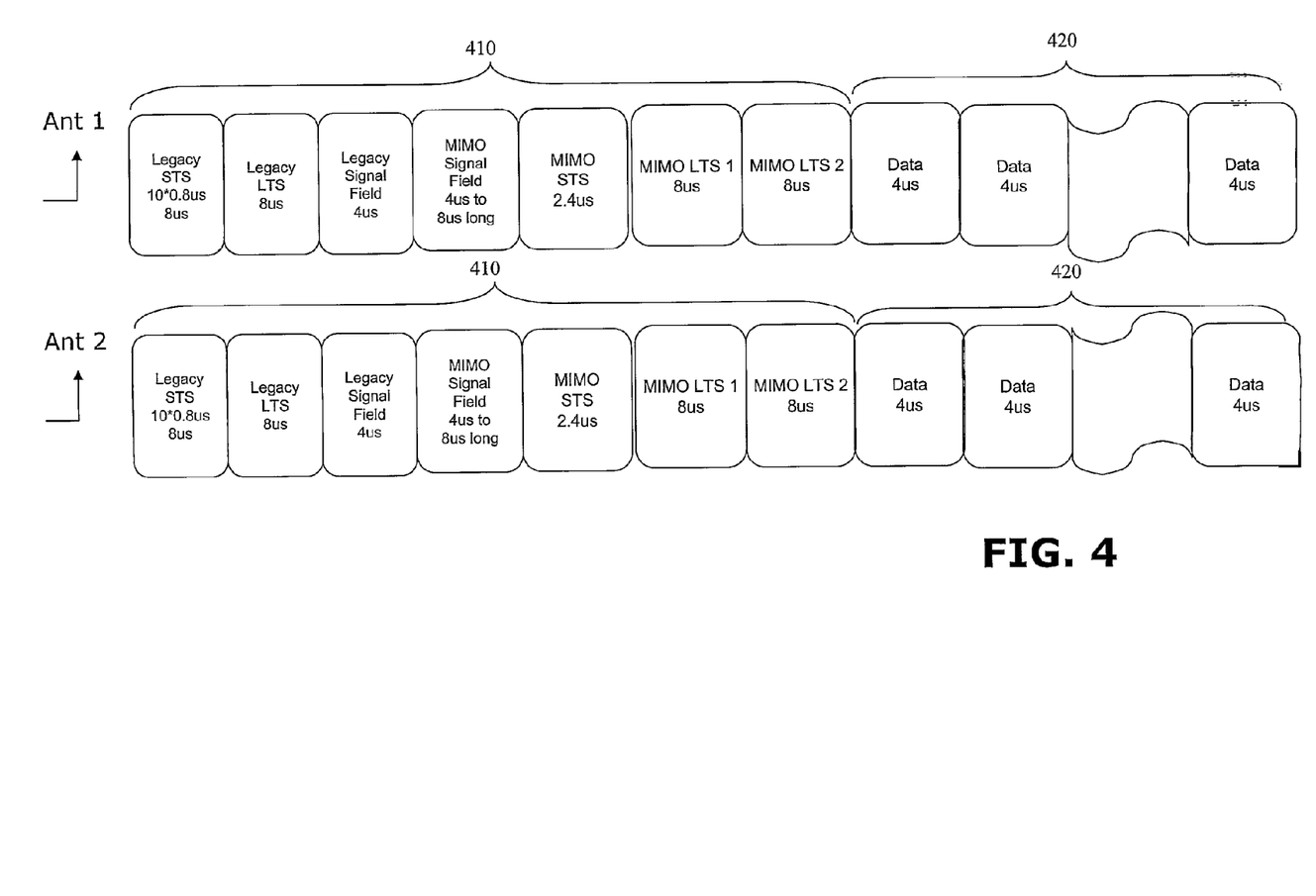
FIG. 4 illustrates an exemplary MIMO frame format for an exemplary 2×2 MIMO system.

FIG. 4 illustrates an exemplary MIMO frame format 400 for an exemplary 2×2 MIMO system. As shown in FIG. 4, each frame 400 comprises a preamble part 410 and a data part 420. The exemplary preamble 410 contains a legacy 802.11a preamble followed by a dedicated MIMO preamble. For a more detailed discussion of suitable preamble formats, see U.S. patent application Ser. No. 11/043,025, filed Jan. 24, 2005, entitled "Method and Apparatus for Preamble Training in a Multiple Antenna Communication System," incorporated by reference herein. In the data transmission, the pilot tones are inserted in the same way as the SISO system, as discussed above in conjunction with FIG. 2. Thus, the pilot tones are transmitted from all the transmitter antennas simultaneously.

Figure 5:
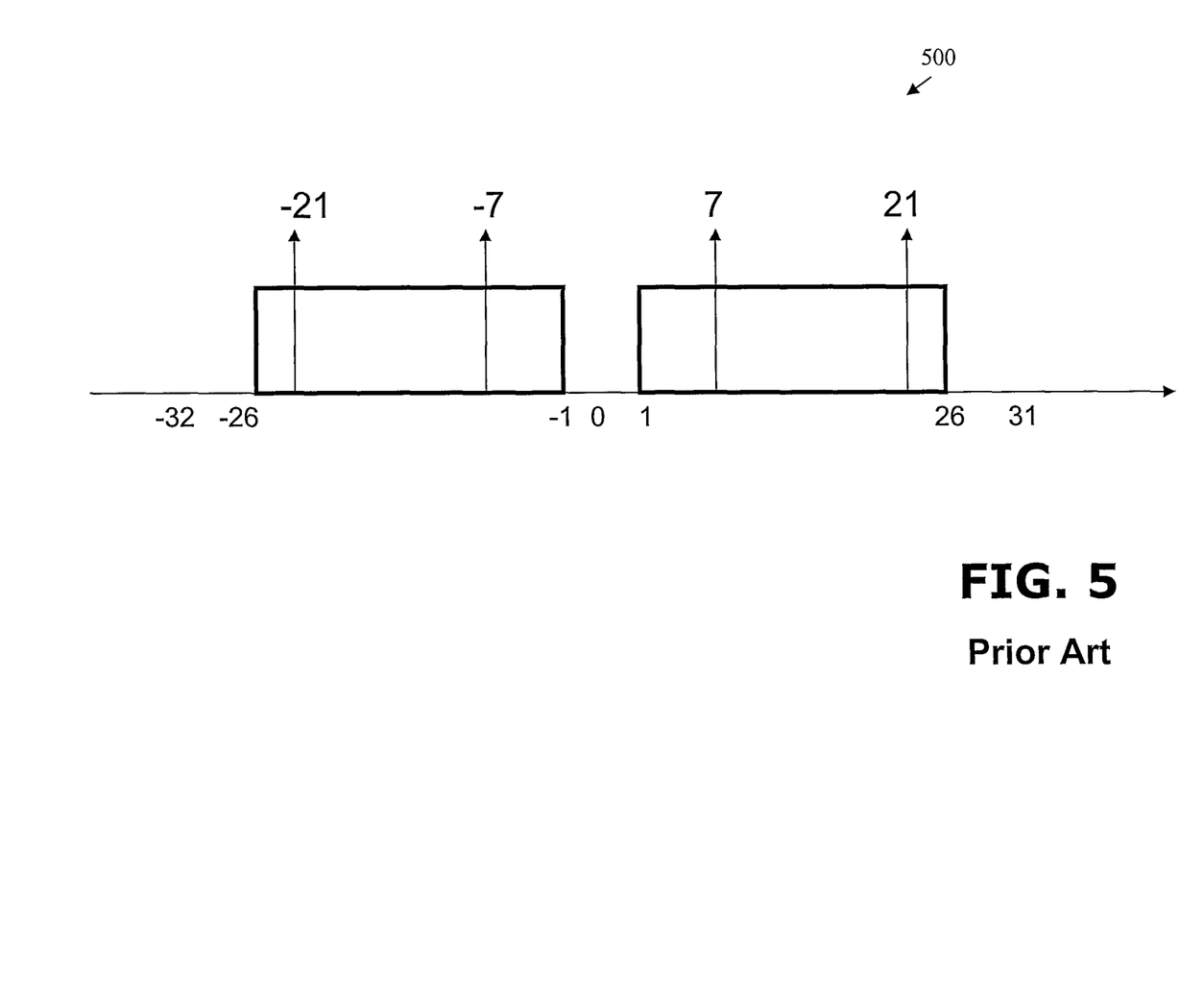
FIG. 5 illustrates the positions of the pilot tones for an exemplary 20 MHz mode.
Figure 6:
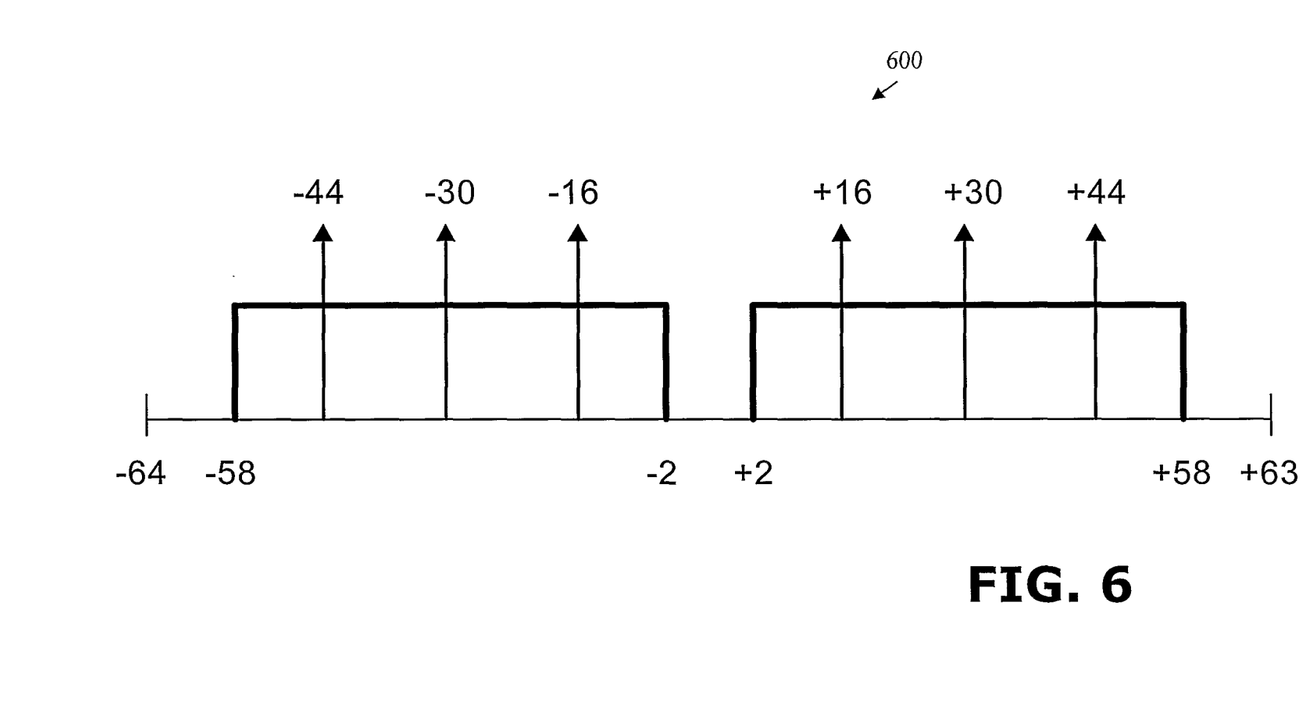
FIG. 6 illustrates the positions of the pilot tones for an exemplary 40 MHz mode.

FIG. 5 illustrates the positions 500 of the pilot tones for an exemplary 20 MHz mode. As shown in FIG. 5, there a total four pilots allocated at the same positions as the 802.11a/g system shown in FIG. 2 (at positions +/−7 and +/−21). The exemplary carrier spacing is 3.125 kHz. FIG. 6 illustrates the positions 600 of the pilot tones for an exemplary 40 MHz mode. As shown in FIG. 6, there are total six pilots in the 40 MHz mode (at positions +/−16, +/−30 and +/−44). The carrier spacing remains at 3.125 kHz.

Figure 7:
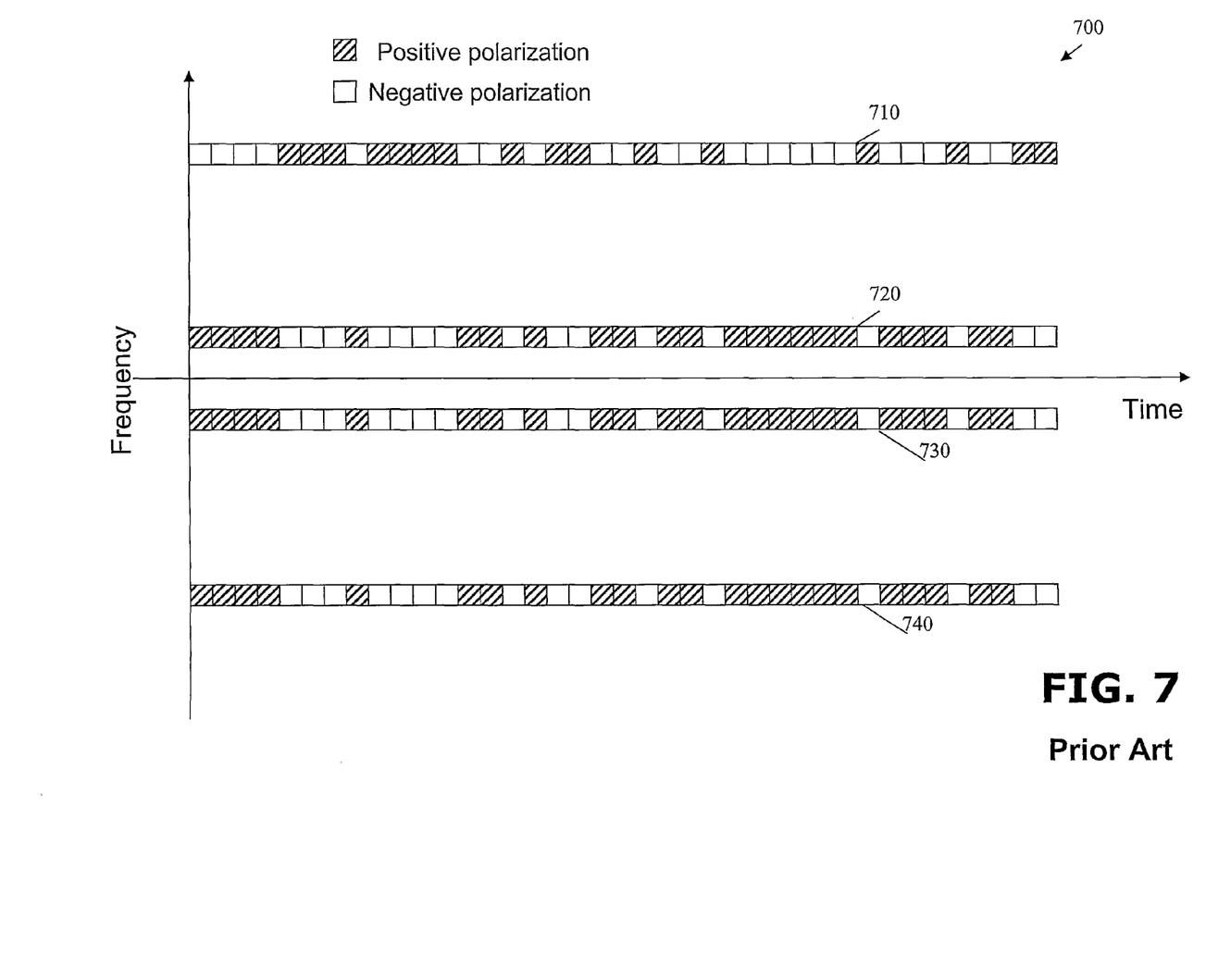
FIG. 7 illustrates the polarization sequence for the exemplary IEEE 802.11a/g pilot signals.

FIG. 7 illustrates the polarization sequence 700 for the exemplary IEEE 802.11a/g pilot signals 710, 720, 730, 740 (all transmitted on one antenna). It is noted that all transmitter antennas transmit the same pilots through the whole packet. The pilot signal changes sign or polarization from symbol to symbol in the time domain, as shown in FIG. 7. For example, in the first time step, −1, +1, +1, +1 is transmitted on the same antenna. In the context of FIG. 7, the term "polarization" means +1 and −1 (i.e., a 180 degree phase shift).

Figure 8:
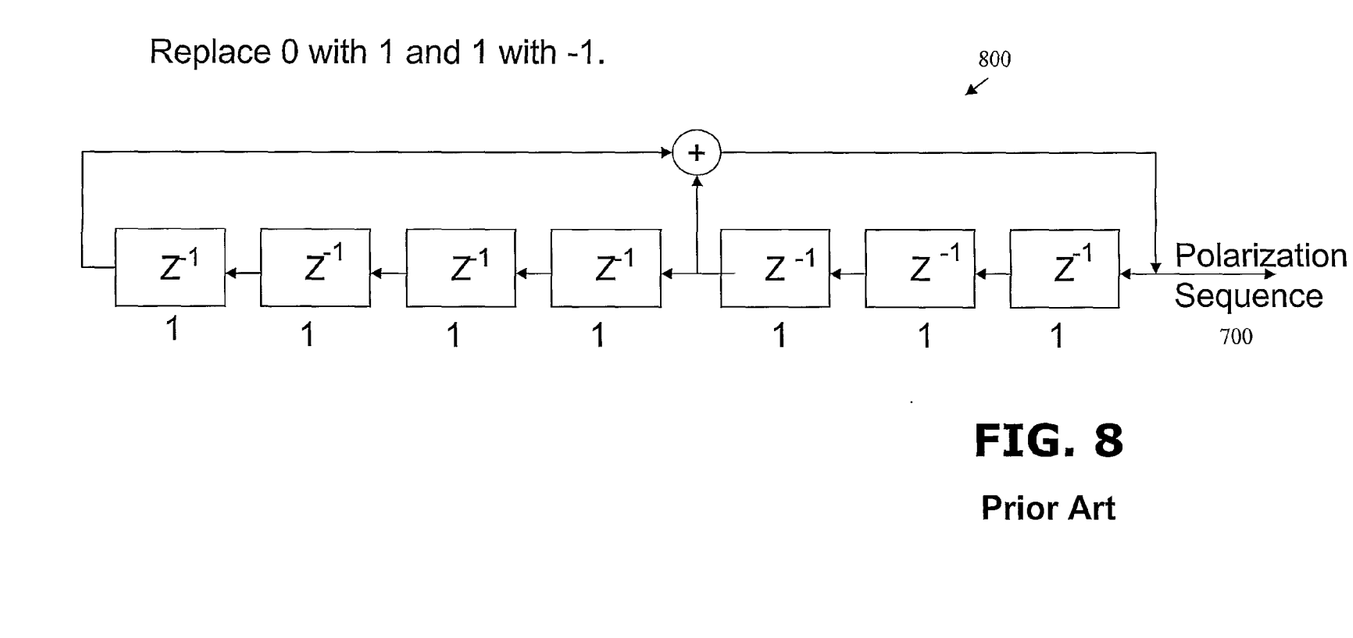
FIG. 8 illustrates the generation of the exemplary polarization sequence of FIG. 7.

FIG. 8 illustrates the generation of the exemplary polarization sequence 700 of FIG. 7. As shown in FIG. 8, the polarization sequence 700 is generated using a scrambler 800 having an initial state of "1111111" and that replaces a value of "0" in the output with a "1" and replaces a value of "1" with a value of "−0.1"

Figure 9:
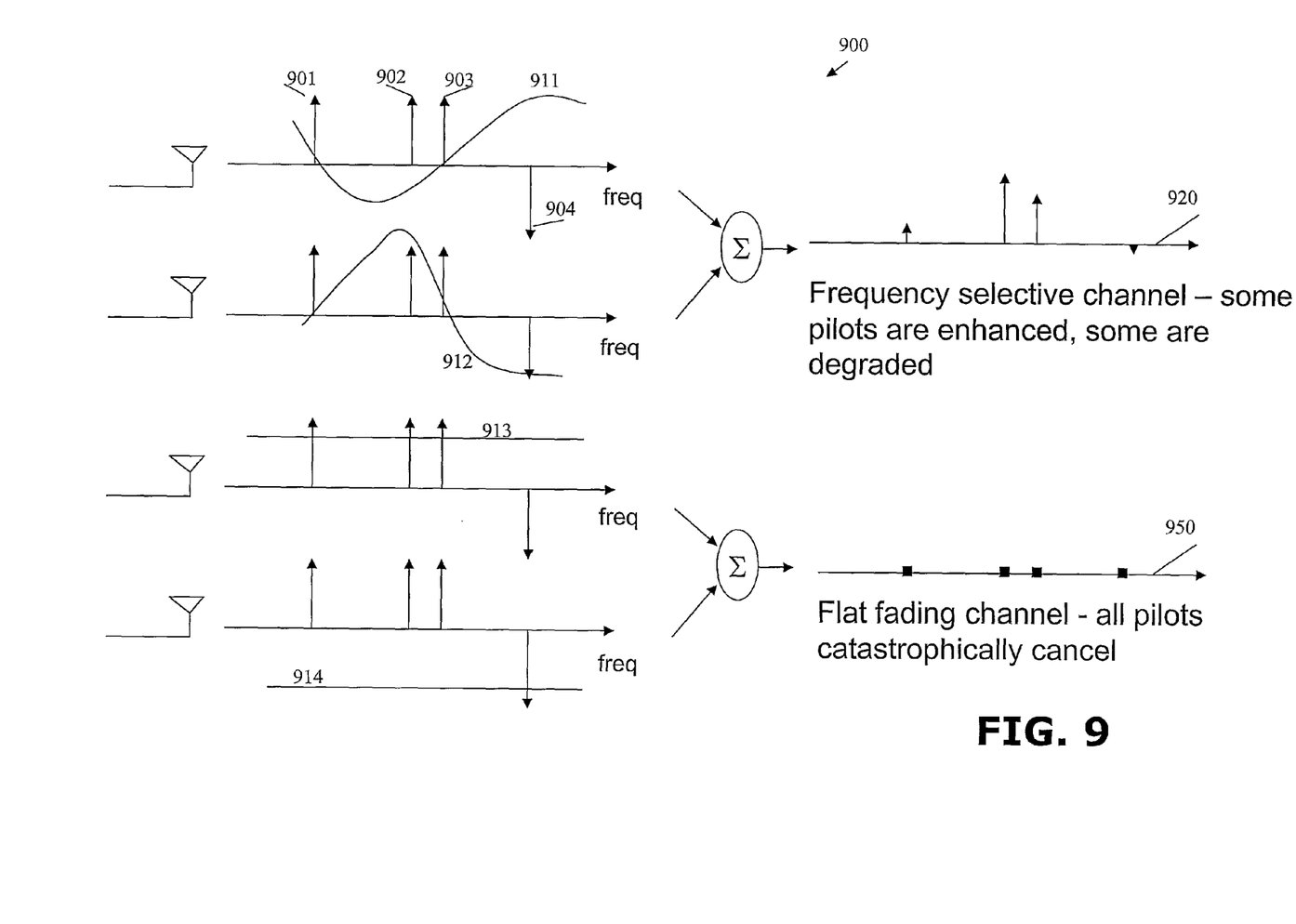
FIG. 9 illustrates the beam forming of the pilot tones.

Generally, MIMO systems transmit the same pilot tones and polarization sequence on all the antennas. The pilots are a deterministic signal. Thus, this can lead to beam forming if the same pilot signals are transmitted from different antennas. FIG. 9 illustrates the beam forming 900 of the pilots, such as pilots 901-904. In a frequency selective channel, different pilot tones experience different channels, as shown by the various channel responses 911-914 in FIG. 9. Thus, not all pilots fade at the same time. Therefore, as shown by the received pilots 920, some pilots get enhanced while other pilots may get cancelled. Overall, the receiver can receive a fairly strong average pilot energy to perform the required function. It has been observed that the beam forming is most severe in the "flat fading" case 913, 914. In this case, all the pilots experience the same channel fading. Then, as shown by the received pilots 950 in FIG. 9, all the pilots can be cancelled out. Thus, although the channel conditions allow the receiver to receive the data correctly, the receiver may not be able to process the data because the pilots are all faded.

The present invention recognizes that this pilot cancellation problem can be overcome by transmitting pseudo-orthogonal pilots across the various antennas. As used herein, the pilots are generally considered pseudo-orthogonal if the cross correlation between the pilots on any two antennas is low. Pilots are orthogonal if the cross correlation between any two pilot sequences is exactly zero. Pilots are pseudo-orthogonal if the cross correlation between any two pilot sequences is a small number below a predefined threshold. According to one aspect of the invention, an orthogonal pilot design is provided in both the frequency and spatial domains.

Transmitting Orthogonal Pilots Across Antennas

According to one aspect of the invention, orthogonal codes in space and frequency are used for the pilot signal with the polarization sequence overlaid in the time domain. The transmission of orthogonal pilot signals across frequency and space mitigates the beam forming effect.

Frequency Orthogonal Pilots

Figure 10:
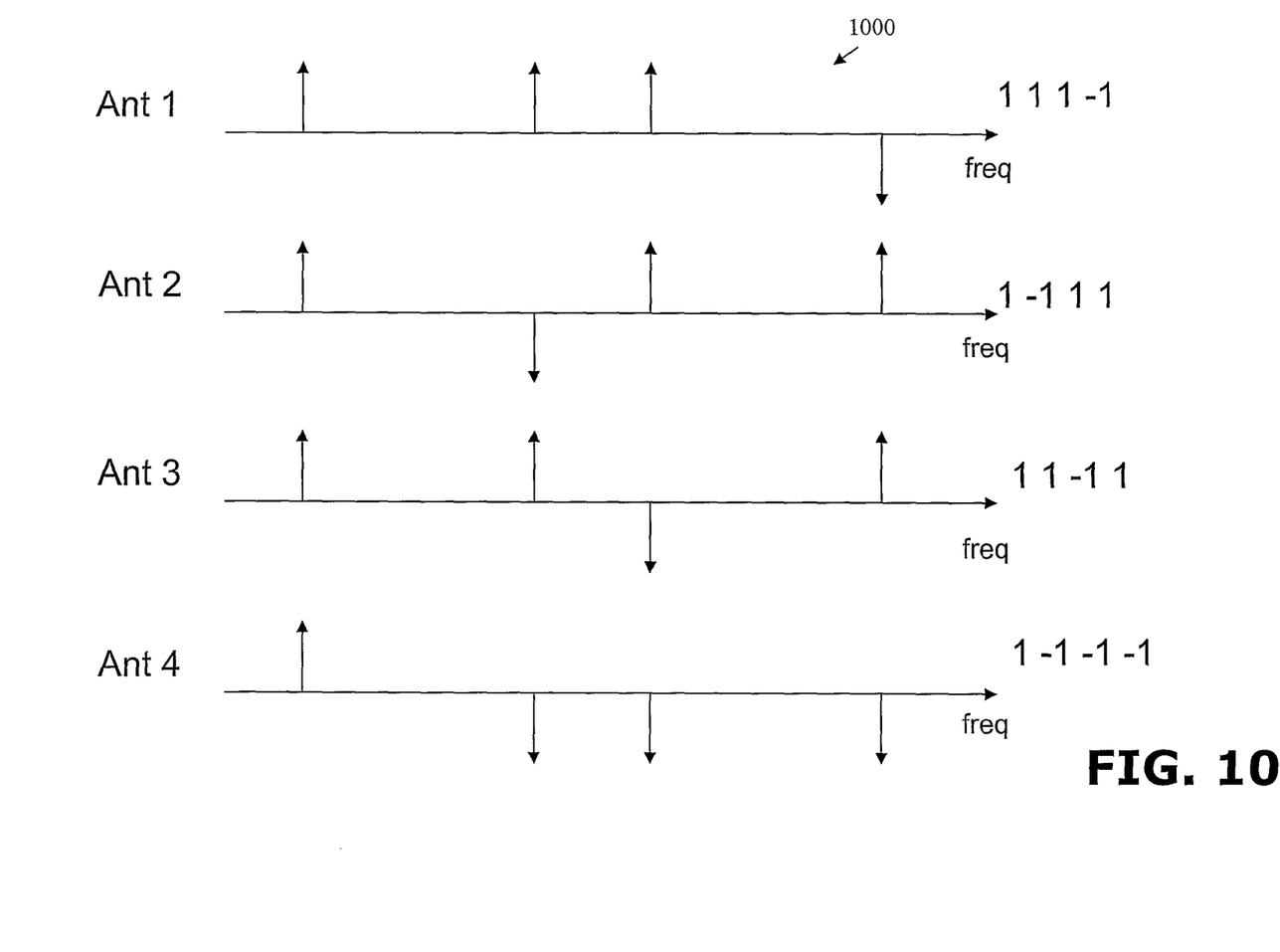
FIG. 10 illustrates a set of frequency domain orthogonal pilots in 20 MHz for an exemplary four antenna MIMO system.

As previously indicated, in an exemplary 20 MHz mode, there are four pilot tones. Thus, four orthogonal codes are required. FIG. 10 illustrates a set of frequency domain orthogonal pilots 1000 in 20 MHz for an exemplary four antenna MIMO system. The pilot design 1000 shown in FIG. 10 still uses a Binary Phase Shift Keying (BPSK) signal, as in IEEE 802.11a/g, based on a 4-by-4 Walsh matrix. Antenna 1 is encoded with the first row of a Walsh matrix, i.e., 1, 1, 1, −1. Likewise, each subsequent antenna, ANT 2 through ANT 4, are encoded with the corresponding row of the Walsh matrix. As shown in FIG. 10, the first antenna, ANT 1, transmits the IEEE 802.11a/g pilots (1, 1, 1, −1). The remaining antennas, ANT 2 through ANT 4, transmit pilots that are orthogonal with the first antenna and with each other. In this case, the antennas are encoded so that they create orthogonal sequences.

Figure 11:
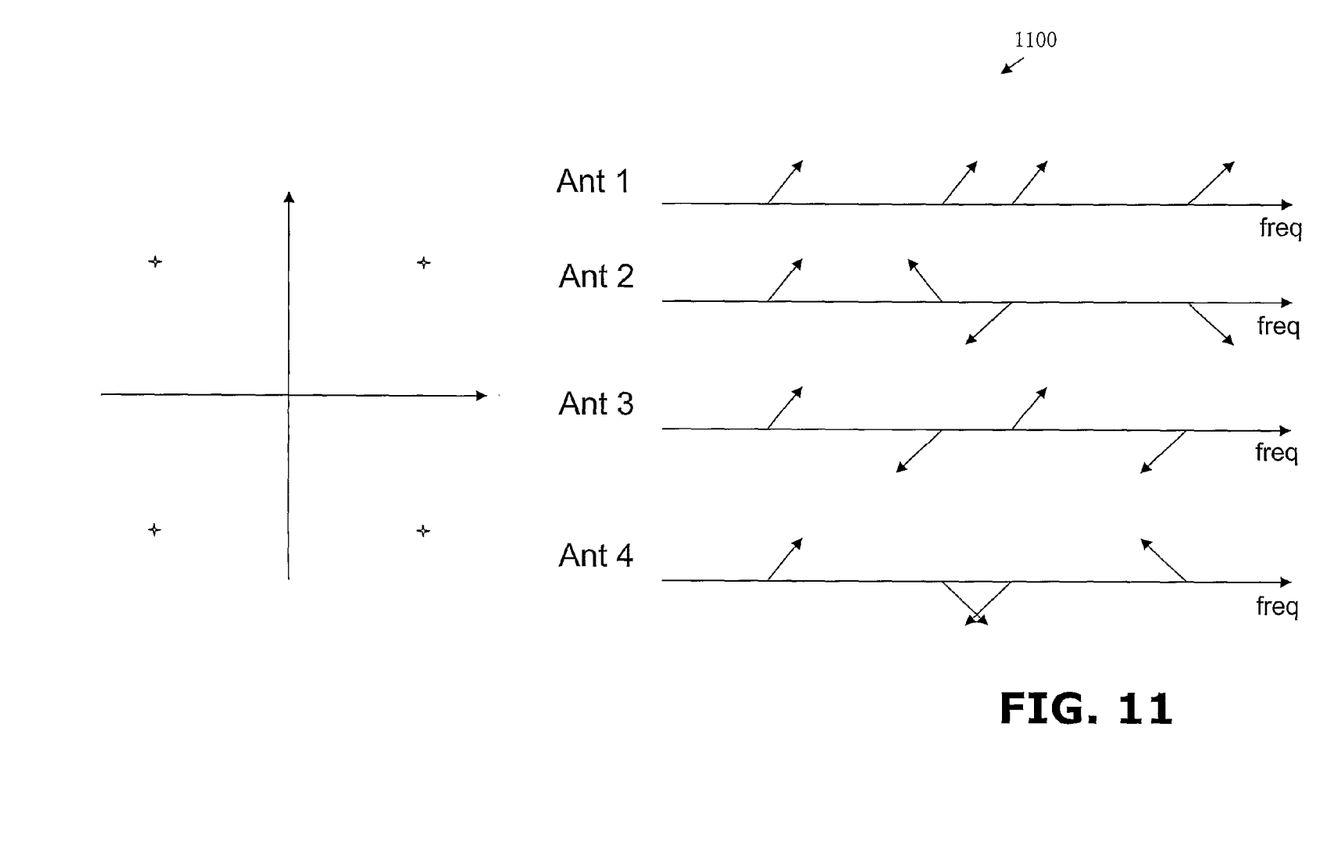
FIG. 11 illustrates an alternate set of 4 frequency domain QPSK-encoded orthogonal pilots in 20 MHz for an exemplary four antenna MIMO system.

FIG. 11 illustrates an alternate set of frequency domain orthogonal pilots 1100 in 20 MHz for an exemplary four antenna MIMO system. In the exemplary embodiment of FIG. 11, a Quadrature Phase-Shift Keying (QPSK) constellation and Fourier transform sequence are used. As shown in FIG. 11, each antenna, ANT 1 through ANT 4, transmits a row of the Fourier transform matrix. In this manner, the four antennas transmit pilots that are orthogonal with each other. It is noted that FIG. 11 is a three dimensional representation, where any pilot tone can point in one of four directions (up, down, into or out of the paper). An orthogonal sequence is obtained based on the constellation on the left side of FIG. 11. The higher number of dimensions of FIG. 11, with an additional degree of freedom, makes it easier to select orthogonal pilot sequences with a greater number of pilots. In the example of FIG. 11, a pilot sequence of up to 8 pilot tones can be created.

Figure 12:
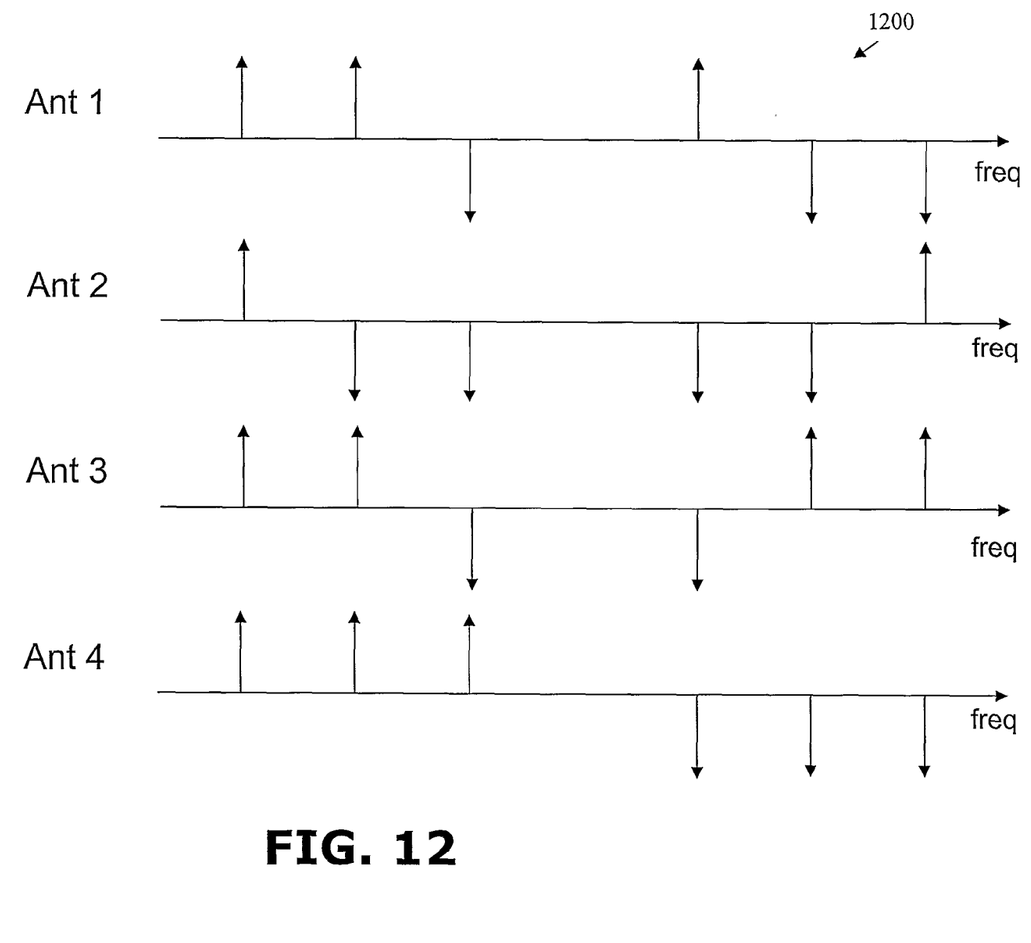
FIG. 12 illustrates a set of 6 frequency domain pseudo-orthogonal pilots in 40 MHz for an exemplary four antenna MIMO system.

In an exemplary 40 MHz mode, there are typically six pilot tones. Thus, six orthogonal codes are required. FIG. 12 illustrates a set of frequency domain pseudo-orthogonal pilots 1200 in 40 MHz for an exemplary four antenna MIMO system. It is noted that a Walsh code that uses a BPSK signal does not exist. If BPSK is employed, then a pseudo noise (PN) sequence can be identified that has minimal cross correlations with each other, although not completely orthogonal. The set of frequency domain pseudo-orthogonal pilots 1200 of FIG. 12 illustrates one set of such a PN sequence. The maximal cross correlation in the example of FIG. 12 is +2, which is less than one half the number of pilot tones on any selected antenna.

Figure 13:
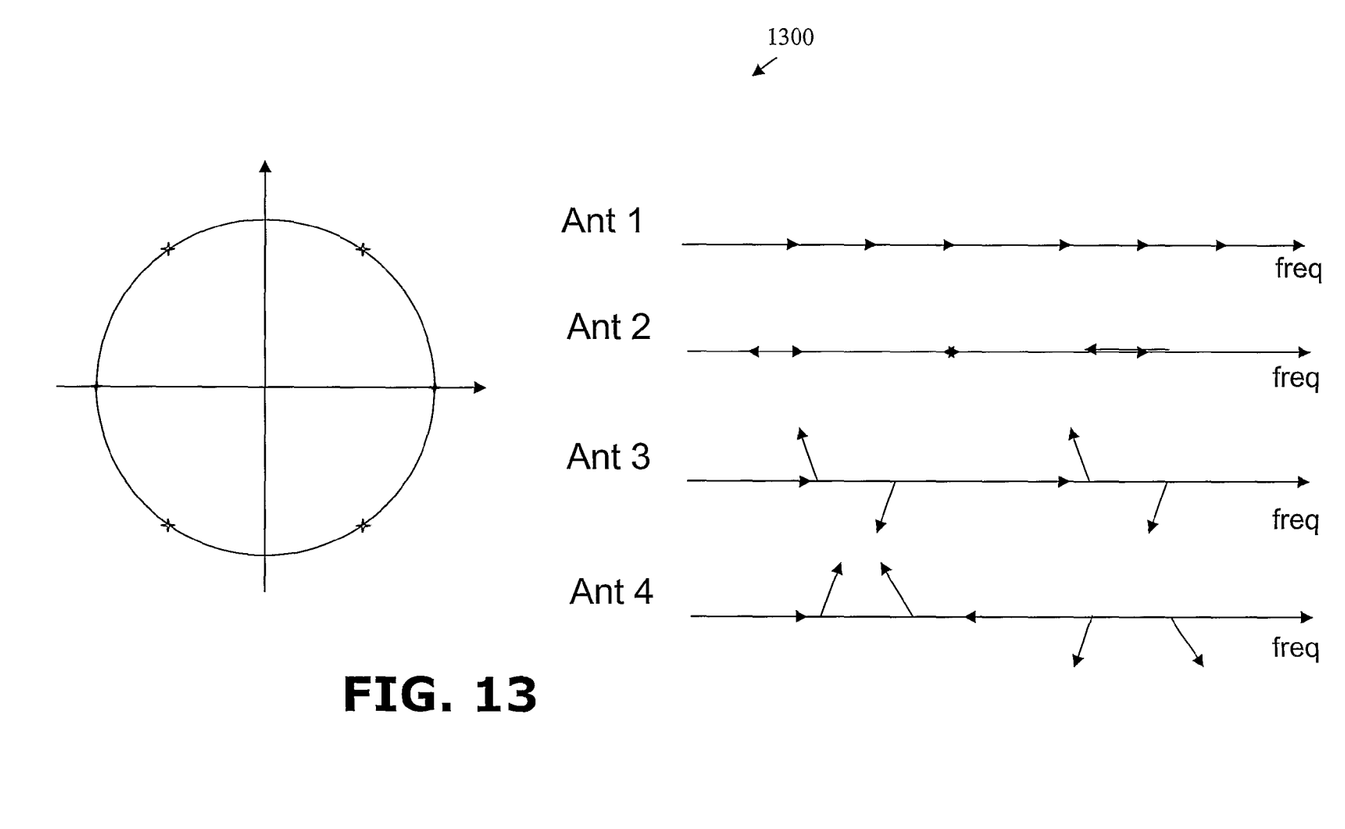
FIG. 13 illustrates an alternate set of 6 frequency domain orthogonal pilots in 40 MHz for an exemplary four antenna MIMO system.

FIG. 13 illustrates an alternate set of frequency domain orthogonal pilots 1300 in 40 MHz for an exemplary four antenna MIMO system. A Fourier sequence must be employed to get an orthogonal code in 40 MHz. The implementation of FIG. 13 employs a 6-PSK constellation and a Fourier transform sequence to obtain completely orthogonal pilot tones for 40 MHz. Each antenna, ANT 1 through ANT 4, transmits one row of the Fourier transform matrix.

Figure 14:
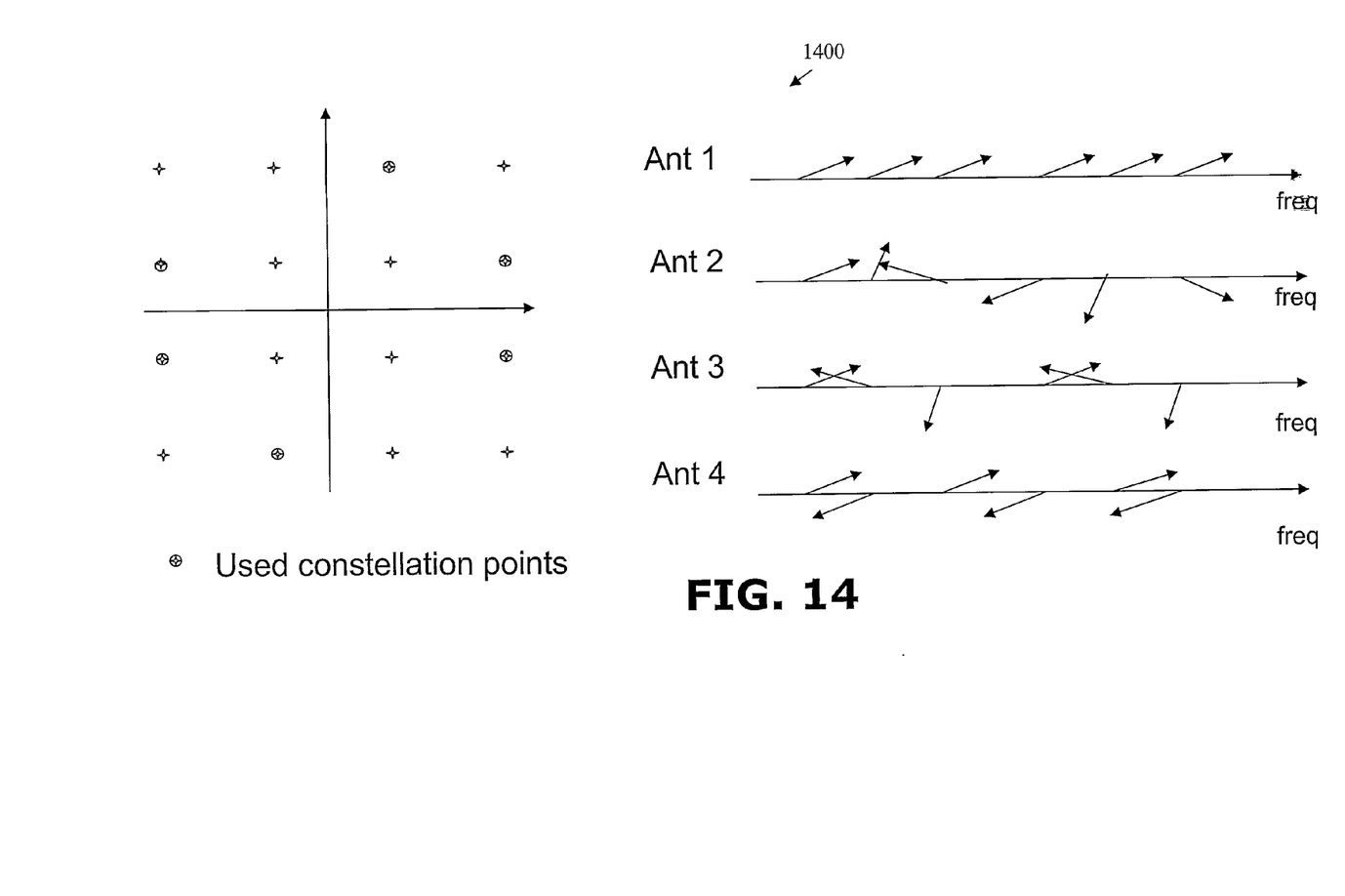
FIG. 14 illustrates a compromise that uses constellation points of 16 QAM to generate the orthogonal pilots that is also used in the data transmission.

A further variation recognizes that the use of a Fourier sequence may be problematic since 6-PSK is used to generate the orthogonal pilots, but is not used in the data transmission. FIG. 14 illustrates a compromise that uses constellation points of 16QAM to generate the orthogonal pilots that is also used in the data transmission. The six points that are used (from the 16 available points) for the pilots is shown in FIG. 14 using a "⊕" character. If 16 QAM is employed, then a set of pilot tones can be generated that has minimal cross correlations with each other, although not completely orthogonal. The six used points "⊕" approximate the 6-PSK constellation points. Assuming that the pilots are transmitted in the same energy as the PSK signal, then the maximal cross correlation is ±089±0.89j (which is better than using the BPSK signal and PN sequence).

Time Orthogonal Polarization

The implementations discussed above in conjunction with FIGS. 10 through 14 find a set of orthogonal pilots in the frequency domain. The orthogonal pilot designs of FIGS. 10 through 14 ensure that within each OFDM symbol, the pilots are not in a deep fade. According to another aspect of the invention, the polarization is also alternated, so that even if all the pilots were in a deep fade in one OFDM symbol, they will not be in a deep fade in the next OFDM symbol. Thus, in such an embodiment, polarization sequences on different antennas must also be different and orthogonal.

It is noted that the packet length is typically variable. Thus, schemes for generating orthogonal or pseudo orthogonal sequences are needed that cover all possible packet lengths. The present invention recognizes that in order to cover all possible packet lengths, more than 3 PN generators should be implemented and then switch among them depending on the packet length.

A. Generation of Orthogonal Polarization Sequences

Generally, if there are L OFDM symbols in a packet, a Fourier transform sequence is employed to generate the pilot tones, the $1^{th}$ OFDM symbol at nth transmitter antenna is expressed as:

$$\exp\left(j\frac{2nl\pi}{L}\right)$$

and a Walsh sequence is expressed as:

$$L=2^k$$

then, the set of PN sequences (having a maximal correlation of −1/L) can be expressed as follows:

| PN Sequence | Sequence Name |
| --- | --- |
| $L = 2^k - 1$ | M-sequence |
| $L = q = 3 \pmod 4$ | Quadratic residue (QR) |
| $L = 2q + 1, q = 1 \pmod 4$ | QR-2 |
| $L = 4t - 1 = 4x^2 + 27$ is prime | Hall sequence |
| $L = p(p + 2)$ where both p and p + 2 are prime | Twin-prime sequence |

B. Generation of Pseudo-Orthogonal Polarization Sequences

As discussed above in conjunction with FIG. 8, a scrambler 800 is used to generate polarization sequences. In order to achieve pseudo-orthogonal polarization sequences in the time domain, however, different antennas now use different initial states. In one implementation, the different antennas actually use the same polarization sequence, but with different shifts. For most packet lengths, such a design actually gives pretty small cross correlation.

Thus, the same scrambler 800 is used for all antennas, but different antennas use different initial state. For example, in an exemplary four antenna MIMO implementation, the four antennas can use the following different initial states:

| | |
|---|---|
| Ant 1: | 1 1 1 1 1 1 1 |
| Ant 2: | 1 0 1 0 1 0 1 |
| Ant 3: | 1 1 0 0 1 1 0 |
| Ant 4: | 1 1 1 0 0 0 1 |

It is to be understood that the embodiments and variations shown and described herein are merely illustrative of the principles of this invention and that various modifications may be implemented by those skilled in the art without departing from the scope and spirit of the invention.

We claim:

1. A method for transmitting data in a multiple antenna communication system having N transmit antennas, said method comprising the steps of:
   generating a number of pilot tones for each of said N transmit antennas, wherein said pilot tones for each of said N transmit antennas are pseudo-orthogonal with each other in a frequency domain and in a space domain; and
   transmitting said data on each of said N transmit antennas.

2. The method of claim 1, wherein said pilot tones are embedded in said data.

3. The method of claim 1, wherein said generating step uses a binary phase shift keying (BPSK) signal based on a Walsh sequence.

4. The method of claim 1, wherein said generating step uses a quadrature phase shift keying (QPSK) constellation and a Fourier transform sequence.

5. The method of claim 4, wherein each of said N antennas transmits a row of a Fourier transform matrix.

6. The method of claim 1, wherein said generating step generates a pseudo noise (PN) sequence based on a BPSK signal having a cross correlation that satisfies a predefined criteria.

7. The method of claim 1, wherein space domains and said generating step employs a p-PSK constellation and a Fourier transform sequence.

8. The method of claim 7, wherein each of said N antennas transmits a row of a Fourier transform matrix.

9. The method of claim 1, wherein said generating step uses quadrature amplitude modulation (QAM) constellation points and said p pilot tones have a cross correlation that satisfies a predefined criteria.

10. The method of claim 9, wherein the predefined criteria is a threshold.

11. The method of claim 1, wherein said generating step further comprises the step of generating a number of pilot tones for each of said N transmit antennas that are also orthogonal in the time domain.

12. The method of claim 11, wherein said orthogonal pilot tones have a polarization that is alternated.

13. The method of claim 11, wherein each of said N antennas have a polarization sequence that is different and orthogonal relative to each of the other antennas.

14. The method of claim 13, wherein the polarization sequence for each antenna is responsive to a unique initial state.

15. The method of claim 14, wherein a single scrambler is used to generate a single polarization sequence that is used for each of the N antennas.

16. The method of claim 1, wherein the pilot tones are simultaneously transmitted.

17. The method of claim 1, wherein generating the number of pilot tones includes overlaying a polarization sequence.

18. The method of claim 17, wherein the polarization sequence is in a time domain.

19. The method of claim 1, further comprising:
   using a set of pseudo noise (PN) generators to generate the number of pilot tones.

20. The method of claim 19, wherein a member of the set of PN generators is selected depending on a packet length.

* * * * *